United States Patent [19]

Thomman et al.

[11] Patent Number: 5,719,890

[45] Date of Patent: Feb. 17, 1998

[54] METHOD AND CIRCUIT FOR TRANSFERRING DATA WITH DYNAMIC PARITY GENERATION AND CHECKING SCHEME IN MULTI-PORT DRAM

[75] Inventors: Mark Thomman; Huy Thanh Vo; Glen E. Hush, all of Boise, Id.

[73] Assignee: Micron Technology, Inc., Boise, Id.

[21] Appl. No.: 456,520

[22] Filed: Jun. 1, 1995

[51] Int. Cl.$^6$ ............................................. G11C 29/00
[52] U.S. Cl. ........................ 371/51.1; 371/37.4; 371/51.2; 395/417; 395/437; 365/230.05; 365/189.05; 365/189.09
[58] Field of Search ...................... 371/51.1, 51.2, 371/37.4; 395/417, 437; 365/230.05, 189.05, 189.09

[56] References Cited

U.S. PATENT DOCUMENTS

| | | | |
|---|---|---|---|
| 4,070,710 | 1/1978 | Sukonick et al. | 395/164 |
| 4,120,048 | 10/1978 | Fuhrman | 365/189.04 |
| 4,183,058 | 1/1980 | Taylor | 365/189.02 |
| 4,513,392 | 4/1985 | Shenk | 395/437 |
| 4,592,022 | 5/1986 | Shimohigashi et al. | 365/149 |
| 4,646,270 | 2/1987 | Voss | 365/189.02 |
| 4,648,077 | 3/1987 | Pinkham et al. | 365/189.12 |
| 4,675,842 | 6/1987 | Szenes et al. | 395/417 |
| 4,692,900 | 9/1987 | Ooami et al. | 365/63 |
| 4,747,081 | 5/1988 | Heilveil et al. | 365/219 |
| 4,775,959 | 10/1988 | Sato et al. | 365/189.09 |
| 4,825,418 | 4/1989 | Ito et al. | 365/207 |
| 4,891,749 | 1/1990 | Hoffman et al. | 395/479 |
| 4,891,794 | 1/1990 | Hush et al. | 365/189.04 |
| 5,001,671 | 3/1991 | Koo et al. | 365/230.05 |
| 5,007,028 | 4/1991 | Ohshima et al. | 365/233 |
| 5,058,051 | 10/1991 | Brooks | 395/494 |
| 5,093,787 | 3/1992 | Simmons | 364/406 |
| 5,187,785 | 2/1993 | Shah | 395/183.01 |
| 5,197,035 | 3/1993 | Ito | 365/230.05 |
| 5,204,841 | 4/1993 | Chappell et al. | 365/230.05 |
| 5,321,652 | 6/1994 | Ito | 365/189.07 |
| 5,335,199 | 8/1994 | Aoyama | 365/230.05 |
| 5,392,302 | 2/1995 | Kemp et al. | 371/51.1 |
| 5,404,337 | 4/1995 | Sato | 365/230.03 |
| 5,406,527 | 4/1995 | Homma | 365/230.05 |
| 5,422,894 | 6/1995 | Abe et al. | 371/37.4 |
| 5,452,259 | 9/1995 | McLaury | 365/230.05 |
| 5,488,584 | 1/1996 | Vo et al. | 365/203 |
| 5,535,159 | 7/1996 | Nii | 365/189.05 |
| 5,579,278 | 11/1996 | McLaury | 365/230.05 |

*Primary Examiner*—Reba I. Elmore
*Assistant Examiner*—McDieunel Marc
*Attorney, Agent, or Firm*—Schwegman, Lundberg, Woessner & Kluth, P.A.

[57] ABSTRACT

An ATM switch including a multi-port memory is described. The multi-port memory having a dynamic random access memory (DRAM) and a plurality of input and output serial access memories (SAMs). Efficient, flexible transfer circuits and methods are described for transferring ATM data between the SAMs and the DRAM. The transfer circuits and methods include helper flip/flops to latch ATM data for editing prior to storage in the DRAM. Editing of ATM data transferred from the DRAM is also described. Dynamic parity generation and checking is described to detect errors induced during switching.

3 Claims, 6 Drawing Sheets

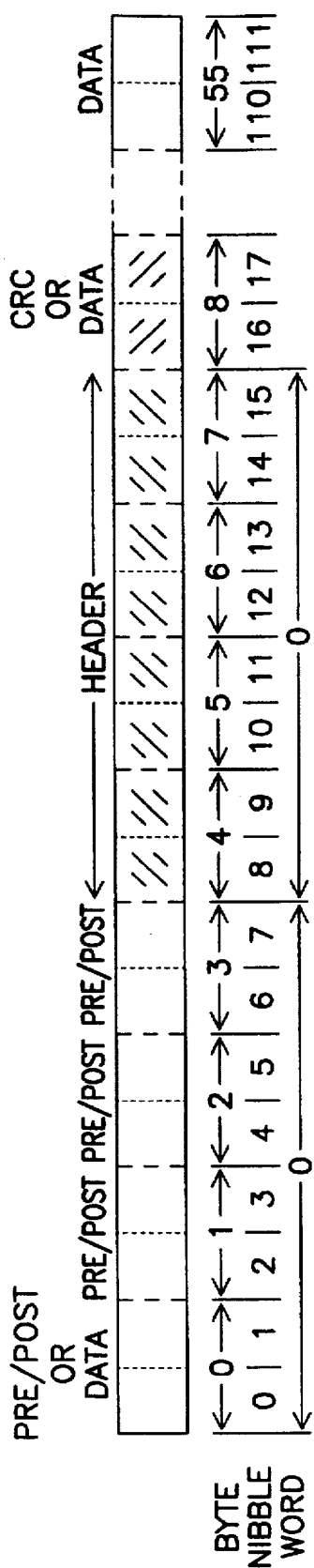
FIG. 3
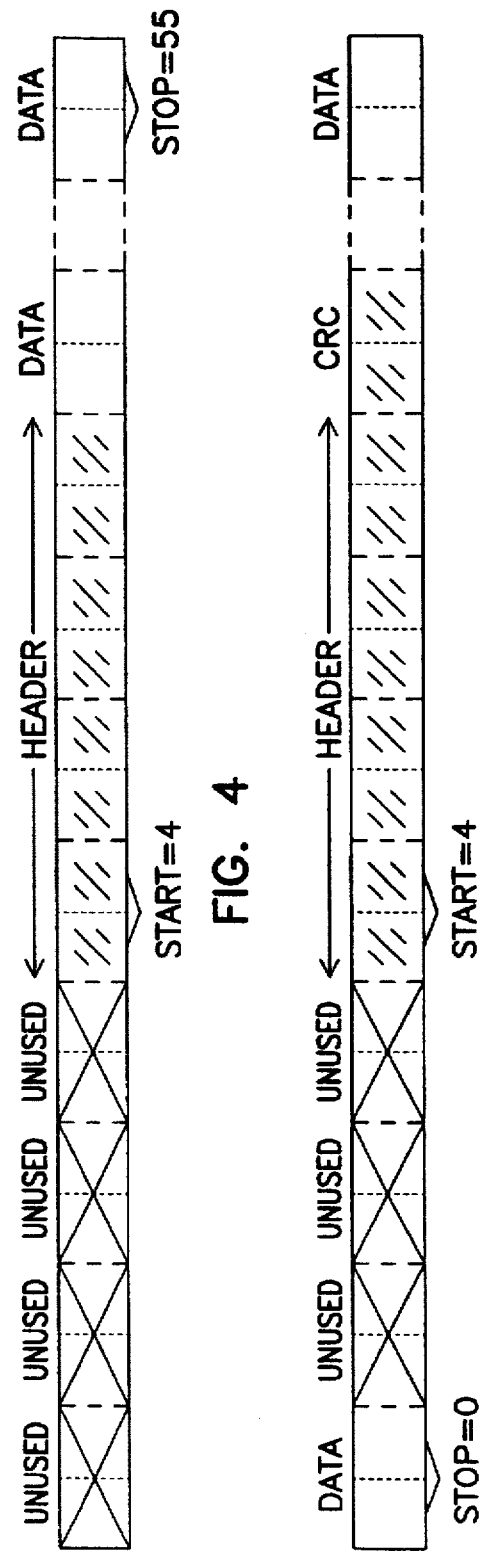
FIG. 4
FIG. 5

METHOD AND CIRCUIT FOR TRANSFERRING DATA WITH DYNAMIC PARITY GENERATION AND CHECKING SCHEME IN MULTI-PORT DRAM

TECHNICAL FIELD OF THE INVENTION

The present invention relates generally to ATM switches and in particular the present invention relates to internally transferring data in a multi-port memory ATM switch.

BACKGROUND OF THE INVENTION

The general increase in network traffic requires fast, efficient methods of managing traffic and congestion. One problem area in network traffic management occurs at line switching where a switch is used to route data from one set of communication lines to another set of communication lines. Network switches typically comprise a memory-type device which is used to temporarily store a transmission during the switching operation.

Different queuing structures have been employed in network switches with varying results. It has been shown that switches which use input queue structures tend to create line blocking. Conversely, switches which use output queue architectures eliminate the line blocking problem. Further, switches used in asynchronous transfer mode (ATM) networks require more storage space than switches used in a more uniform transmission network. That is, ATM traffic tends to have bursts of data and be non-uniform, thereby requiring an increased amount of available memory at any given time to maintain an acceptable switching time for the ATM traffic. Poor switch time performance can result in the loss of ATM data during switching operations.

The increased demand for more memory and the need for faster switching times has resulted in the need for a fast, efficient ATM switch. Further, the variety of different ATM data cell structures requires that the switch be flexible. One specific problem in ATM switching is the need to change the routing of an ATM cell to avoid highly congested traffic paths. This typically requires that a header included in the ATM cell be amended to denote a new route, or destination address. Additional information included in an ATM cell, such as error check data, may also need to be updated. Further, because memories are susceptible to the inducement of errors, an ATM switch should include an error check scheme to monitor the occurrence of any errors induced during switching.

For the reasons stated above, and for other reasons stated below which will become apparent to those skilled in the art upon reading and understanding the present specification, there is a need in the art for a fast, flexible ATM switch which efficiently updates the muting or destination address of an ATM cell. There is a further need for such a switch which includes an internal error check.

SUMMARY OF THE INVENTION

The above mentioned problems with ATM switches and other problems are addressed by the present invention and which will be understood by reading and studying the following specification. A transfer circuit and method are described in a multi-port memory which provide a fast, flexible ATM switch.

In particular, the present invention describes a multi-port memory comprising a plurality of input serial access memories (ISAMs) used to store asynchronous transfer mode (ATM) data, a dynamic random access memory (DRAM) used to receive and store the ATM data from the ISAMs, and a plurality of output serial access memories (OSAMs) used to receive and store the ATM data from the dynamic random access memory. The multi-port memory also comprises an error code generator, and a write transfer circuit connecting the ISAMs, the error code generator, and the DRAM together. The error code generator in the preferred embodiment is a parity code generator. The write transfer circuit includes an edit buffer, an error code check circuit, and a read transfer circuit connecting the error code check circuit, the OSAMs, and the dynamic random access memory together. The read transfer circuit includes an edit register.

The write transfer circuit can further comprise a plurality of write transfer buses having one bus electrically coupled to one bit of each ISAM. The error code generator circuit comprises a plurality of helper flip/flops with each one of the plurality of helper flip/flops connected to one of the plurality of write transfer buses, and an error code generator connected to the plurality of helper flip/flops and generating an error signal therefrom. Further, the edit buffer can comprise a plurality of helper flip/flops with each one of the plurality of helper flip/flops connected to one of the plurality of write transfer buses.

In another embodiment, the read transfer circuit comprises a plurality of read transfer buses having one bus electrically coupled to one bit of the plurality of output serial access memories. Further, the error code check circuit can comprise a plurality of helper flip/flops with each one of the plurality of helper flip/flops connected to one of the plurality of read transfer buses, an error code generator connected to the plurality of helper flip/flops and generating an error code therefrom, and a comparator connected to the error code generator which compares the generated error code with a pre-defined error code. Finally, a parity error circuit can be included to monitor the error code check circuit.

BRIEF DESCRIPTION OF THE DRAWINGS

FIG. 3 is a 56 byte ATM cell having a specific byte assignment;

FIG. 4 is a 52 byte ATM cell having a specific byte assignment;

FIG. 5 is a 53 byte ATM cell having a specific byte assignment;

DETAILED DESCRIPTION OF THE INVENTION

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
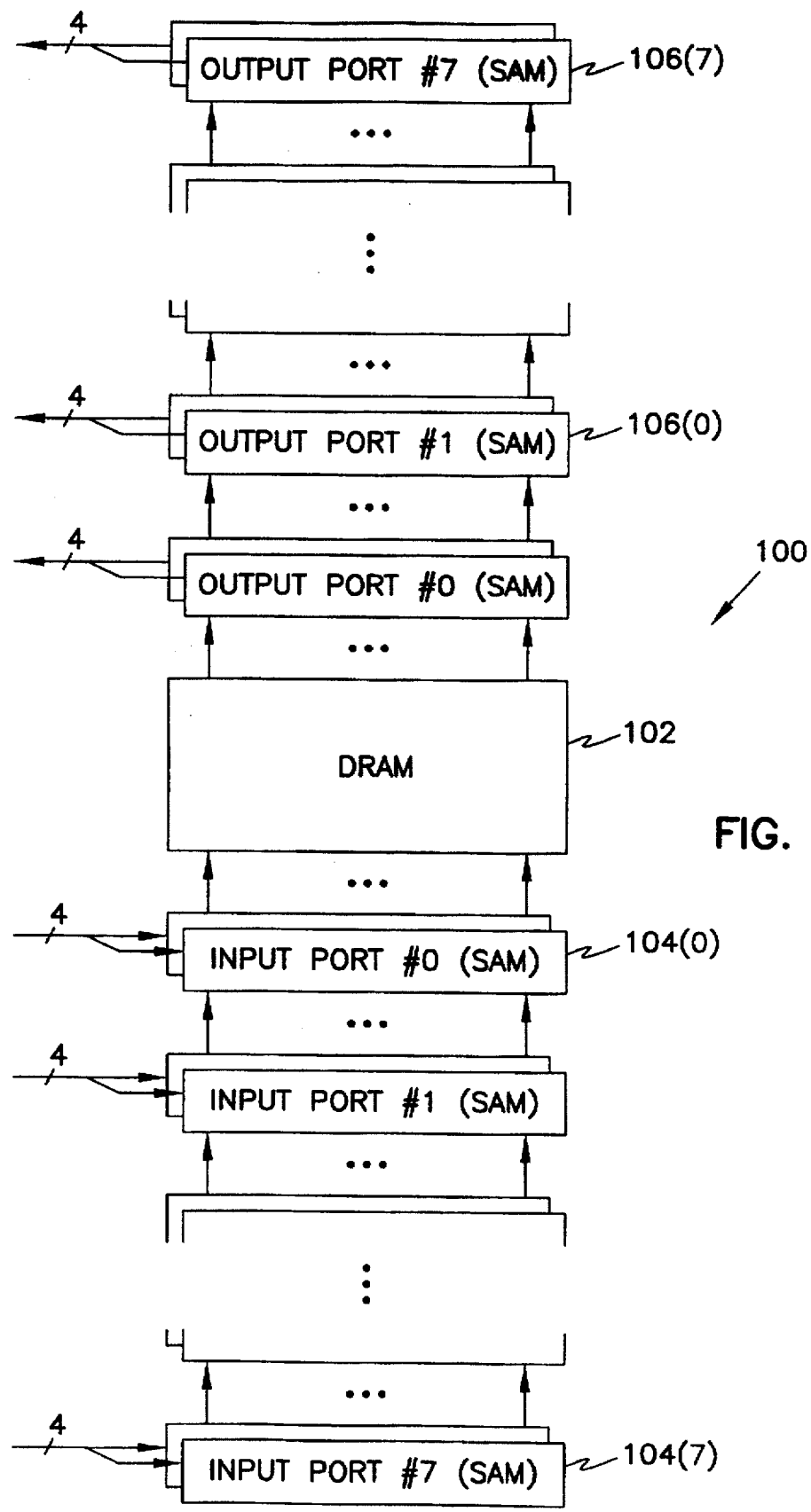
FIG. 1 is a simplified block diagram of a multi-port memory.

The present invention is described as being incorporated in a multi-port memory. The simplified block diagram of the multi-port memory 100 shown in FIG. 1 can be used to solve data path requirements for asynchronous transfer mode (ATM) networks. The memory has a dynamic random access memory (DRAM) 102 and eight double-buffered input serial access memories (SAMs) 104(0)–(7). The eight output SAMs 106(0)–(7) are also double-buffered. The input SAM's can accept back-to-back ATM cells such that one full ATM cell can be moved into the DRAM from an input port while a second ATM cell is being loaded into the input port. Likewise, the output SAM's can output one ATM cell on a four bit data bus while a second ATM cell is being transferred from the DRAM.

ATM cells flow through input ports into the input SAM's where editing can be performed. The ATM cells are transferred to the DRAM and then transferred to the output SAM's where further editing can be performed. The ATM cells are output on communication lines via output ports.

Figure 2:
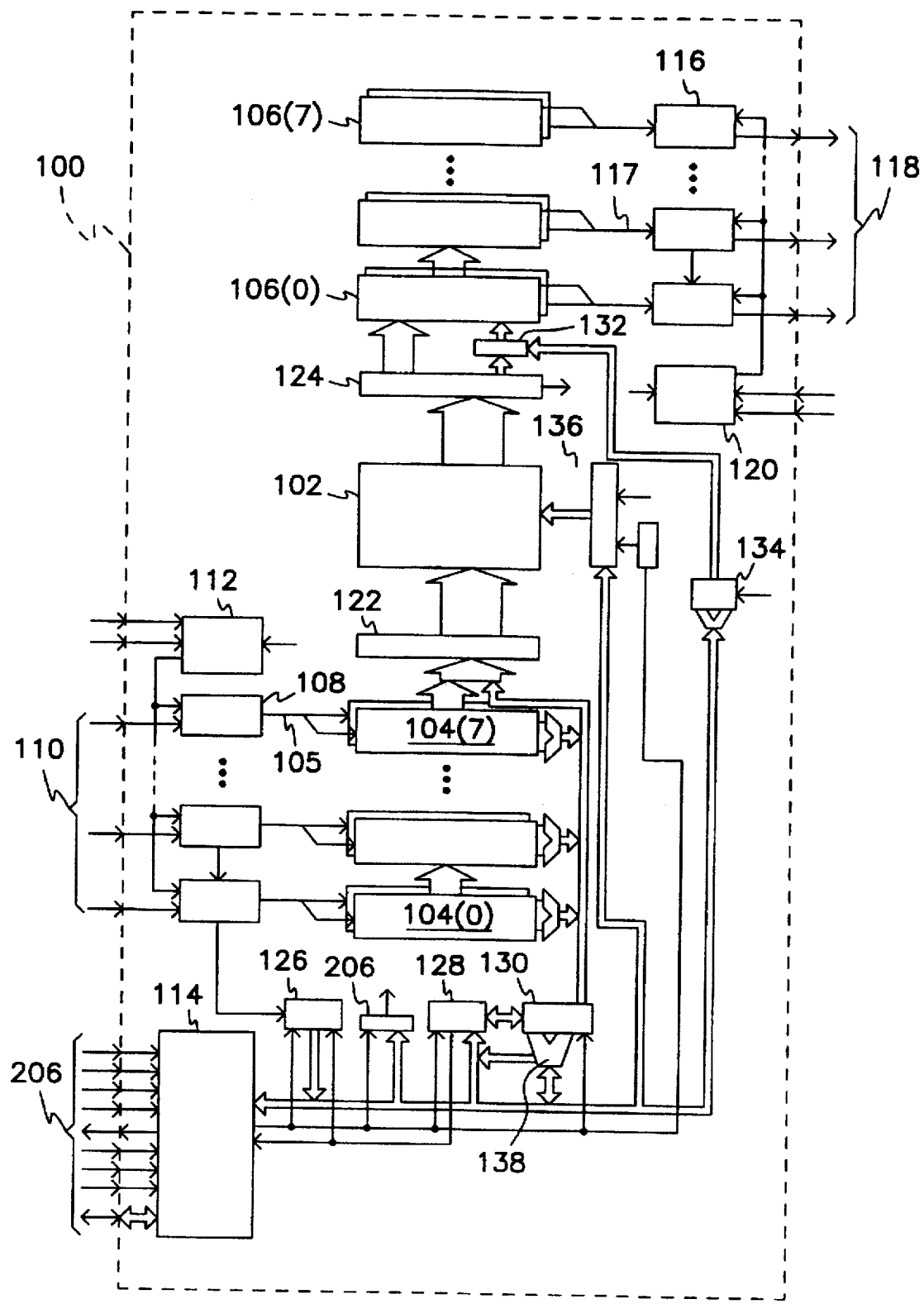
FIG. 2 is a detailed block diagram of the multi-port memory of FIG. 1.

A more detailed diagram of the multi-port memory 100 is shown in FIG. 2. The memory has a DRAM 102, input SAMs 104(0)–(7) and output SAMs 106(0)–(7) as described above. Each input port has a corresponding buffer circuit 108. The buffer circuits 108 are used to perform several functions including latch and buffer input data, queue nibble counter, and pointer decoder and control. Four-bit input data communication bus lines 110 provide ATM cell input to the buffer circuits 108. An input frame and clock circuit 112 connected to the buffer circuits both denotes the beginning of an input cell and synchronizes the input data.

Each output SAM 106 has a corresponding buffer circuit 116. The buffer circuit 116 is used to perform several functions including latch and buffer output data, queue nibble counter, and pointer decoder and control. Four-bit output communication bus lines 118 provide ATM cell output from buffer circuits 116. An output frame and clock circuit 120 connected to the output buffer circuits denote the beginning of an output cell and synchronizes the output data.

Byte parity generator 122 provides a parity code for each ATM cell transferred to the DRAM from an input SAM 104, and byte parity check 124 checks the parity of an ATM cell transferred from the DRAM to an output SAM 106. The byte parity generator 122 and byte parity check 124 are described below.

Control interface and command decode 114 interfaces the multi-port memory 100 with an external controller (not shown) and decodes commands provided on interface lines 206 therefrom. Error/status circuit 126 monitors the status of the input SAM's 104 to determine if a transfer to the DRAM is needed and tracks the output from the byte parity check 124 to determine if an error occurred in an ATM transfer. Cyclical redundancy check (CRC) logic 128 and edit buffer control 130 together provide a means of modifying the ATM cell prior to transferring it from an input SAM port 104 to the DRAM, as described below. An output editor 132 and output edit buffer 134 allow for the modification of the ATM cell prior to outputting through the output SAMs 106. Memory control circuit 136 provides the circuitry needed to address the DRAM as known by one skilled in the art.

ATM DATA FLOW

Referring to FIG. 2, in general, ATM cells flow through the buffer circuits 108 into the input serial access memory (ISAM) 104 where editing can be done by an external control function provided through the control interface. The external control function instructs the chip when to store ISAM cells in the DRAM 102 and when to load the output serial access memory ports (OSAM) 106 from the memory 102. The OSAMs deliver the ATM cells to output buffers 116 for dispatch. The following paragraphs describe the data flow in more detail.

ATM cells enter the chip through communication line inputs 110 to the input buffers 108. The 4-bit parallel stream is loaded into an ISAM 104 by the clock associated with the buffers over 4-bit data bus 105. The input frame and clock circuit 112, marking the first data nibble of the ATM cell, is used to start the ISAM load. Once a complete cell has been loaded into an ISAM, the sam error/status circuit 126 sets a "ISAM full" status bit. As noted above, the ISAMs are two ATM cells long, so the next ATM cell can continue to stream into the ISAM. An asynchronous, external control function polls the ISAM status through the control interface and command decode 114. Once a ISAM full status is detected by the external controller through the control interface and command decode 114, the first 72 bits of the ISAM are copied to the input edit buffer 130 and the first or second word of the ISAM can be output to the external controller using mux 138. The external controller evaluates and optionally modifies the word and then initiates a write to the DRAM moving the content of the input edit buffer (bits 0–71) and the remaining content of the ISAM (bits 72–447) over a write transfer bus to the DRAM row specified by an address presented through the memory logic control 136. The ISAM full status is cleared when the ISAM is transferred. The first and/or second word of the input edit buffer 130 can be returned by the external controller to modify the content of the ISAM. Further discussion of the input edit buffer operation is presented below. The entire contents of an ISAM can also be directly transferred to the DRAM without copying or evaluating the first 72 bits. In this operation the entire cell is transferred intact.

The external controller polls an output port status through the control interface and command decode 114 for empty OSAMs. Once an empty OSAM 106 is detected, a DRAM read is initiated to move data at a DRAM row specified by an address from the memory control 136 over a read transfer bus to the OSAM. The first or second word of the ATM cell can be edited by output edit register 132. Further discussion of the output edit register operation is presented below. Like a write transfer, the transfer to an OSAM clears the empty OSAM status. OSAMs are double buffered, and similar to the ISAMs can continuously stream data out of the output buffers 116. The 4-bit parallel stream is clocked over 4-bit data bus 117 by the clock associated with the output buffers 116 by output frame and clock circuit 120.

CELL EDIT OPERATIONS

The multi-port memory stores ATM cells of 56 bytes in the internal DRAM 102. The standard ATM cell consists of 4 bytes of header, 48 bytes of data, and one byte of header-error-check. The header-error-check is typically a cyclical redundancy check (CRC) code, which is used on communication links and may or may not be presented to the multi-port memory. The remaining space, either 3 or 4 bytes depending on the presence of the CRC, can be used to store specialized routing information for space-division switches, specialized error control information, or any other purpose. These additional bytes are referred to herein as "prepend/postpend" data, and the number of bytes of each is configurable. The prepend/postpend data can be generated, read, written, and stripped through cell editing operations and configuration parameters as detailed below.

The input edit buffer 130, in concert with the CRC circuitry 128, provides a means to modify the ATM cell captured in an ISAM 104 before storing in the DRAM 102. These modifications can be either of the cell header, or of the prepend/postpend data attached to the cell. Updating of the cell header can also include an update of the CRC byte.

The output edit register 132 provides the means to modify the ATM cell contents at the last possible moment prior to outputting the cell. The output edit register provides data to an OR-type logic function, allowing the control interface and command decode 114 to set selected bits in the cell header or prepend/postpend data. If the cell header is updated, the corresponding CRC can also be updated using the output edit register.

All ATM cell editing is performed using the external controller. The external controller can get either the prepend/postpend or header word from an ISAM through edit buffer 130 and mux 138. The first 9 bytes (72 bits) of the selected ISAM are copied into the input edit buffer 130, and either the first or second word out is passed through mux 138 to the command interface and command decode 114, and ultimately to the external controller. A check of the CRC byte can also be performed using CRC logic 128.

After the external controller has examined the header and/or the pre/postpend data, it may update them via a transfer command or a transfer with CRC command. For example, the transfer with CRC command tells the memory to updated the CRC byte. After updating, the controller issues a store ISAM command to copy the ISAM data into the DRAM with any modifications that may have been made in the edit buffer 130 and CRC logic 128.

The output edit register 132 contains 64 data bits that are NOR'ed with the header and prepend/postpend data bytes from the DRAM on its way to an OSAM. This provides a way for the external controller to modify an ATM cell just prior to transmission, to include e.g. up-to-date congestion information, or up-to-date prepended routing information for a next stage switch. The output edit register 132 is controlled by the external controller. Corrections to the CRC byte can also be performed based on an updated header. The CRC byte is updated by an XOR logic operation.

Editing support for various cell lengths is accomplished by defining the ISAM start and stop positions within the ISAM's 56 byte space. The start and stop pointers are loaded by the command interface and command control 114, and are set such that the cell header appears in bytes 4-7 of the ISAM. The CRC byte, if present, is always in byte 8 of the ISAM. FIG. 3 shows the ISAM space with the ATM cell header properly aligned. For the cases without any pre/postpend data, FIG. 4 show the ISAM start pointer set to 4 and the ISAM stop pointer set to 55 if no CRC is present (making a 52 byte cell). Similarly, FIG. 5 shows the start pointer set to 0 if CRC is present (making a 53 byte cell).

There are different configurations for the ISAMs, each giving various amounts of prepended and postpended data. The values of start and stop positions for different configurations are given in Table 1. It will be understood that values other than these may also be used in a carefully designed non-ATM system.

TABLE 1

|  | W/O CRC | | With CRC | |
| --- | --- | --- | --- | --- |
|  | Start | Stop | Start | Stop |
| Without pre/postpend data | 4 | 55 | 4 | 0 |
| 1 byte prepend | 3 | 55 | 3 | 0 |
| 1 byte postpend | 4 | 0 | 4 | 1 |
| 2 bytes prepend | 2 | 55 | 2 | 0 |
| 1 byte prepend & 1 byte postpend | 3 | 0 | 3 | 1 |
| 2 bytes postpend | 4 | 1 | 4 | 2 |
| 3 bytes prepend | 1 | 55 | 1 | 0 |
| 2 bytes prepend & 1 byte postpend | 2 | 0 | 2 | 1 |
| 1 byte prepend & 2 bytes postpend | 3 | 1 | 3 | 2 |
| 3 bytes postpend | 4 | 2 | 4 | 3 |
| 4 bytes postpend | 0 | 55 | | |
| 3 bytes prepend & 1 byte postpend | 1 | 0 | | |
| 2 bytes prepend & 2 bytes postpend | 2 | 1 | | |
| 1 byte prepend & 3 bytes postpend | 3 | 2 | | |
| 4 bytes postpend | 4 | 3 | | |

The OSAM start and stop address are separately configurable from the ISAM ones. Thus, outgoing cells can have more bytes or fewer bytes than incoming cells. This feature provides the capability for adding or deleting prepended and postpended data bytes. The table of start and stop addresses is identical to that for the ISAMs given above in Table 1.

TRANSFER OPERATIONS

Figure 6:
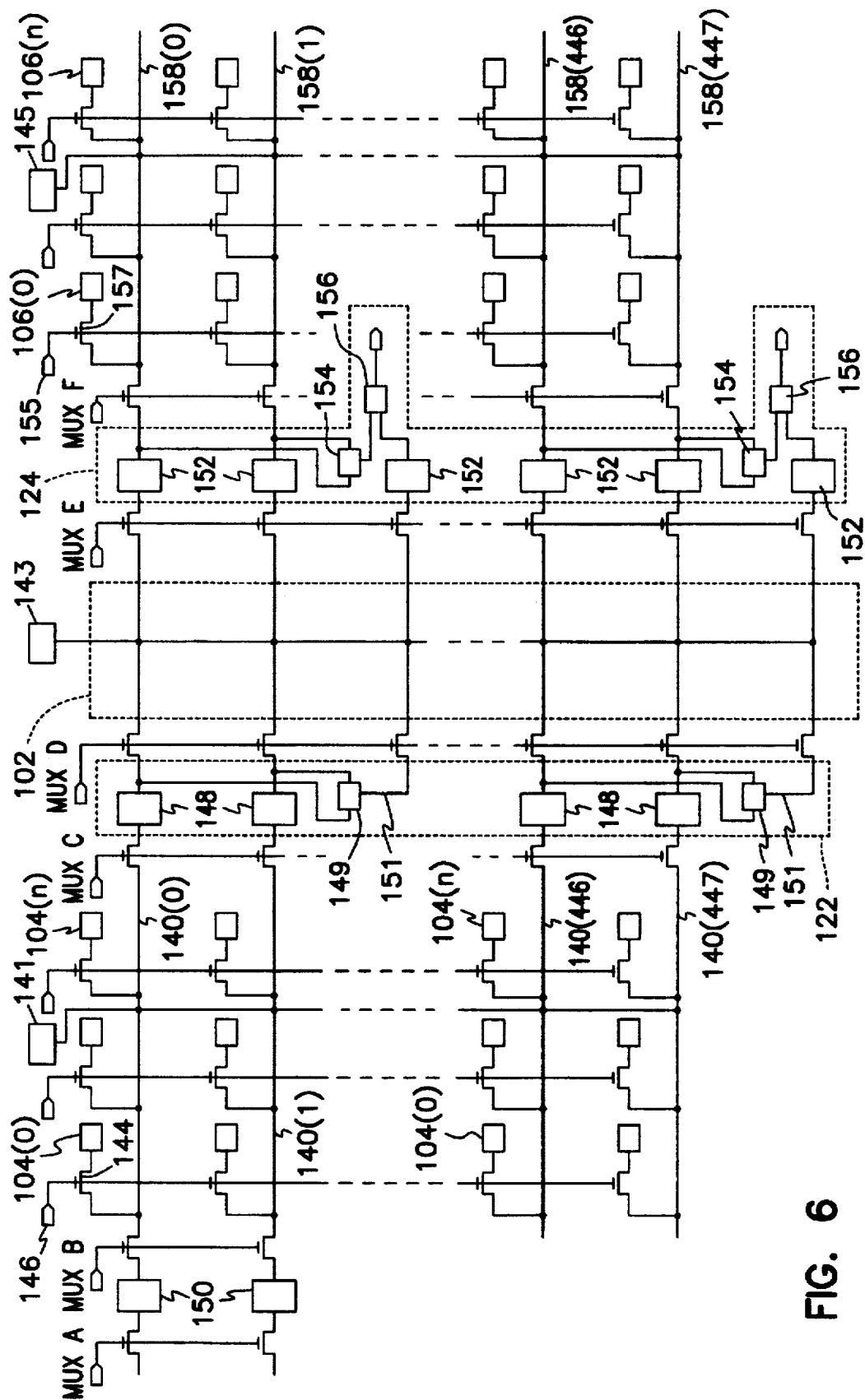
FIG. 6 is a block diagram of the transfer circuit of the multi-port memory of FIG. 2.

As described above, there are 376 data bus lines and 72 other bus lines (56 bytes) connecting the ISAMs to the byte parity generator 122 through a write transfer bus. After the parity bytes are generated by byte parity generator 122, there are 504 bus lines (63 bytes) connected to the DRAM. Similarly, 504 bus lines connect the DRAM to the byte parity check 124 and a total of 448 lines are connected to the OSAMs through a read transfer bus. Four of these bus lines are illustrated in FIG. 6, two data buses and two header bus lines. Transfer buses 140(0) and (1) are the first two buses used to connect the first two bits of the prepend/postpend byte of the ATM cell from ISAMs 104 to DRAM 102. Transfer buses 142(446) and (447) are the last two bits of the 56 bytes of the ATM cell. FIG. 6, shows the "true" transfer bus line. It is noted that for each transfer bus there is an accompanying complement transfer bus line which is not illustrated.

In the most simple example, the contents of an ISAM 104 are write transferred to the DRAM 102 and then read transferred to an OSAM 106. Accurately and efficiently transferring an ATM cell, however, often requires manipulation of portions of the cell as described above. Transfer buses 140(0) and (1) can be connected through transistors 144 to the first two bits of each ISAM, noted as 104(0)-104 (N) (where n is equal to 7 in this embodiment). Control lines 146 can be selectively activated to turn transistors 144 on, thereby connecting one of the ISAMs to one of the transfer buses. Multiplex (mux) lines A through F are used to isolate sections of the transfer buses during certain transfer operations. For example, to get the ISAM header from ISAM 104(0), the write transfer buses 140 are pre-charged with pre-charge circuit 141, control line 146 is selectively activated and mux line C (initially activated) is deactivated to isolate the write transfer buses from helper flip/flops 148 (HFF). HFFs are known to one skilled in the art, and illustrated in FIG. 7. Mux line A remains turned off to isolate HFFs 150 from the edit buffer control 130 connected thereto. Mux line B, however, is activated so that the contents of the ISAM cell 104(0) can be captured by HFFs 150. Control line 146 is deactivated to isolate ISAM cell 104(0) from write transfer buses 140. Mux line B is then deactivated and mux line A is activated so that the edit buffer control 130 and CRC logic 128 can access and modify the header, prepend/ postpend, and CRC bytes latched in HFFs 150.

As explained above, the 32-bit header and the 32-bit prepend/postpend data can be modified using the edit buffer control 130. This is accomplished by selectively changing the state of HFFs 150. A new CRC code can also be generated for the modified header using CRC generator 128 such that the HFFs 150 associated with the 8-bit CRC code are selectively changed using edit buffer control 130. Using HFFs 150 provides a fast, low power way of accessing and modifying the state of the ISAM bits. After HFFs 150 have been selectively changed, mux line A is deactivated and mux lines B and C are activated. The contents of HFFs 150 are transferred to HFFs 148. HFFs 148 are isolated from the write transfer bus 140 and the DRAM 102 by deactivating mux lines C and B.

Parity generator 122 has generator circuits 149 which generate a parity bit for every 8 write transfer bus lines. That is, the contents of one byte of HFFs 148 produce one bit of parity data 151. The 448 bits of data transferred from the ISAMs 148 is appended, therefore, with 56 parity bits, for a total of 504 bits transferred to DRAM 102.

The 376 data bus lines connected to the ISAMs are used to transfer data to the DRAM through write transfer bus 140 and HFFs 148. The ATM data is not modified and is therefore directly transferred to HFFs 148 where corresponding parity bits are generated. After all parity bits 151 have been generated, mux line D is activated and the contents of all 504 HFFs are transferred to a DRAM row address accessed with memory control 136.

Mux line E is activated to perform a read transfer of an ATM cell stored in the DRAM 102 to the OSAMs 106. The contents of the DRAM row accessed is transferred to HFFs 152 and mux line E is then deactivated. Byte parity check 124 has a parity generator 154 which produces a parity bit for each byte of the 56 bytes of the ATM cell. The parity bits are compared to the parity bits 151 stored in the DRAM during the write transfer operation using comparator circuit 156. Any parity errors are thereby identified using Comparator 156 and error status circuit 126.

Mux line F is activated to connect the read transfer buses 158 to the HFFs 152 and the intended OSAM is selectively accessed using control lines 155 and corresponding transistors 157. Output edit register 132 (not shown in FIG. 6) is used to modify the contents of the 72 bits comprised of the header, prepend/postpend and CRC bits. The header and prepend/postpend bytes are modified by using an NOR gate so that each bit output from the HFFs 152 are NORed with an output from the edit buffer output 134. Similarly, the CRC bits are individually XORed with an output from the edit buffer output 134. A post-DRAM edit is typically performed so that an ATM cell can be broadcast to a plurality of locations instead of one location. It will also be understood that a post-DRAM edit can be used to change the address of the intended individual receiver which was designated prior to storing in the DRAM.

It will be understood that a pre-charge circuit 141, 143, or 145 is included with select segments of transfer bus 158 which can be isolated using a Mux line. This allows each segment to be pre-charged prior to connecting to another segment, as described below. It will be further understood that Mux F and the pre-charge circuit 145 associated there- with can be replaced with an inverter and a pre-charge circuit at its input. The input of the inverter would therefore remain high unless a low signal was present at HFF 152. The output of the inverter would then toggle high from its normally low state.

SAM to HFF Transfer

Figure 7:
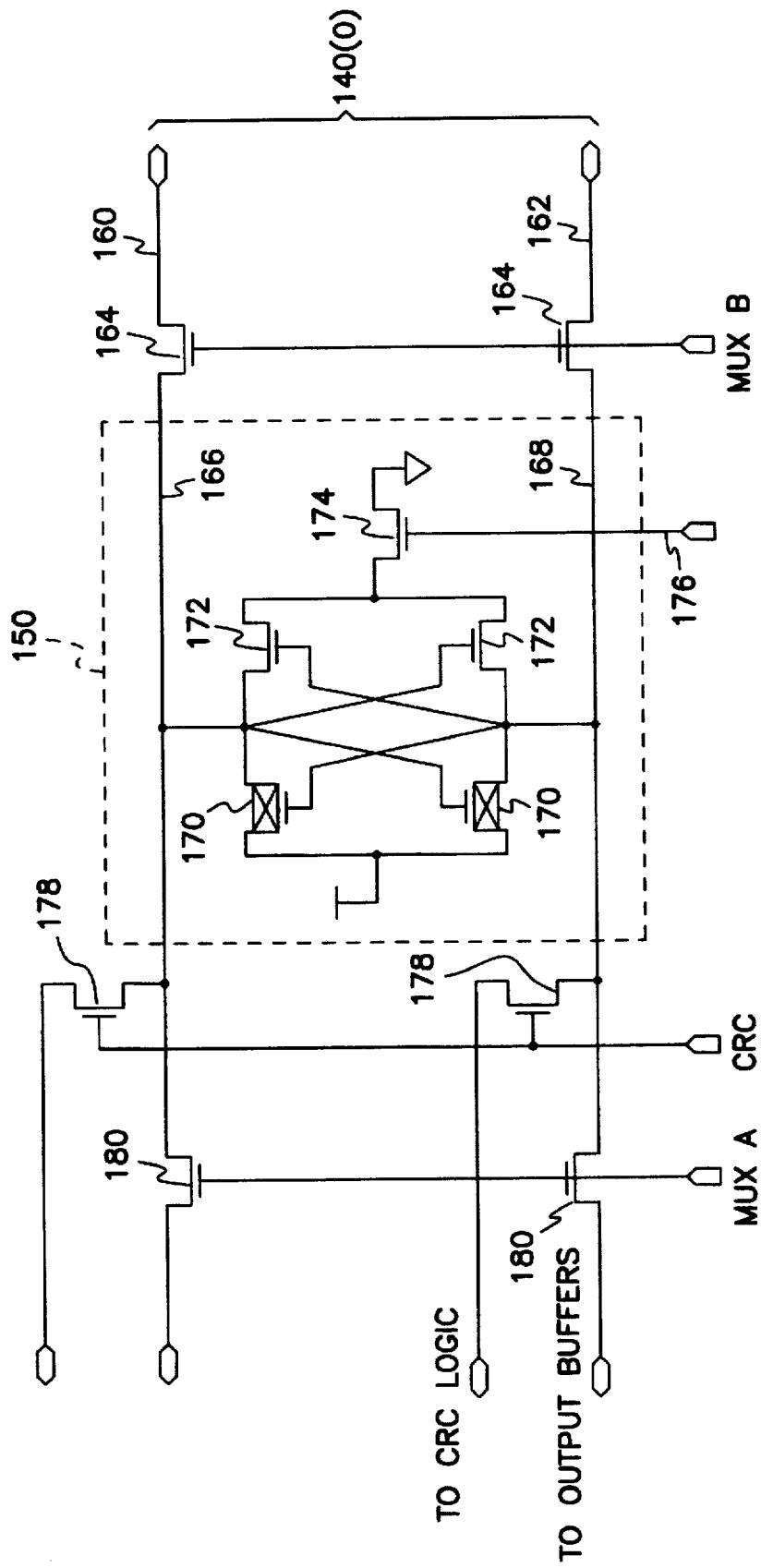
FIG. 7 is a schematic of a helper flip/flop portion of the transfer circuit of FIG. 6.

Referring to FIG. 7, a standard HFF architecture is illustrated. More specifically, FIG. 7 shows HFF 150 connected to the edit buffer control 130 which is connected to write transfer bus 140(0). Both the true 160 and complement 162 lines of the write transfer bus lines 140(0) are shown. Transistors 164 are connected to electrically isolate the write transfer bus lines 160 and 162 and the HFF true 166 and complement 168 data lines. HFF 150 is comprised of two n-type transistors 170 and two p-type transistors 172 having their gates cross-coupled to the true 166 and complement 168 data lines. The sources of transistors 170 are connected to the supply voltage and the drains of transistors 172 are connected to enable/latch transistor 174. Enable line 176 is connected to the gate of enable/latch transistor 174. Transistors 178 are used to electrically connect the HFF 150 to the CRC logic 128. Likewise, Transistors 180 are connected to mux line A and are used to connect HFF 150 to output buffer of the control interface and command decode 114. HFF 150 latches the state of the true and complement data lines when enable line 176 goes high.

Figure 8:
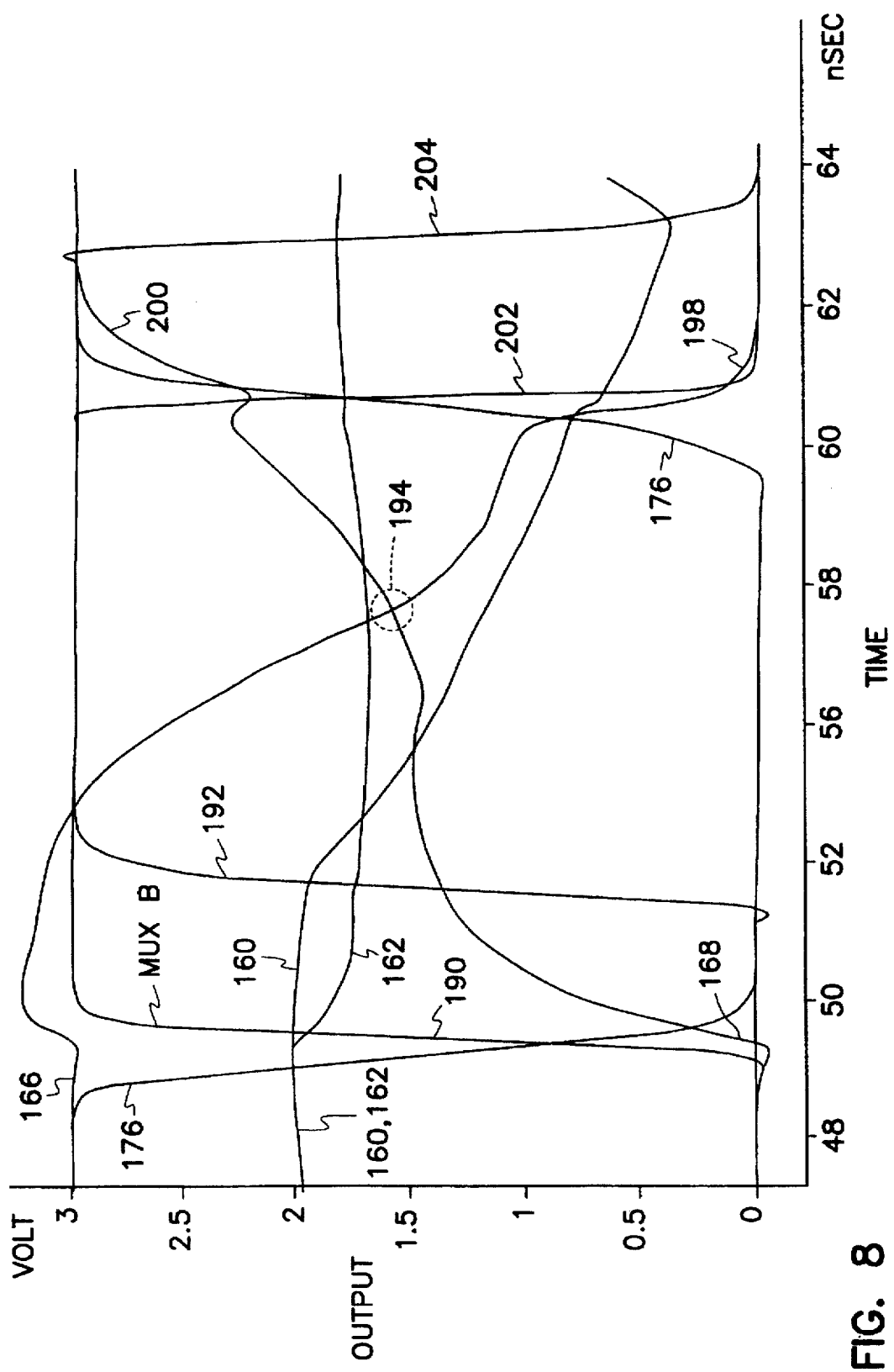
FIG. 8 is a graph of a transfer of data from an input serial access memory to an edit buffer circuit of the multi-port memory of FIG. 2.

Representative voltages and timing of an HFF 150 latch operation of data stored in an ISAM cell header are illustrated in FIG. 8. The voltages and timing are intended as illustrations and are not to be taken as limitations. Prior to transferring data from an ISAM to the HFF 150, the write transfer bus true 160 and complement 162 lines are both pre-charged to speed the data latch. The prior-state latched by the HFF in this illustration is such that the true data line 166, is high and the complement data line 168, is low. The latch enable line 176 toggles to a low state, thereby shutting transistor 174 off. The drains of transistors 172 are, therefore, floating. Mux line B goes high at 190 to electrically connect the HFF 150 to the write transfer bus lines 160 and 162. The write transfer bus is still pre-charging so that the true line 160 remains high and the complement line 162 attempts to remain high as the complement data line 168 is pulled high. The pre-charge circuit is turned off at 192 and the pass gate, or control line 146, to the SAM cell is also activated at 192 so that the ISAM is connected to the write transfer bus. In this illustration, the state of the SAM cell is such that the true line 160 of the write transfer bus is lower than the complement line 162. As a result, the HFF true data line 166 is pulled low and the HFF complement data line 168 continues to increase until the HFF data lines cross at 194. At the cross-over point 194, the HFF changes state. That is, the n-type transistor 170 connected to the HFF complement data line 168 begins to turn on, thereby continuing to pull the complement data line higher. After the data lines have crossed over, the enable line 176 is activated so that transistor 174 is turned on. Both data lines 166 and 168 are forced to the power rails at 198 and 200, respectively, and the HFF has latched the state present on the ISAM cell. Mux line B is then de-activated at 202 to electrically isolate the HFF from the write transfer bus. Finally, control line 146 is de-activated to isolate the SAM from the write transfer bus and the transfer bus pre-charge is turned on at 204.

FIG. 8 illustrates the process of latching a state of an ISAM cell which is opposite of the prior-state of the HFF. It will be understood that latching a state which is the same as the prior-state follows a similar process, except the HFF never crosses over. Further, after the HFF has latched the ISAM cell, the HFF can be accessed by the command interface and command control 114 or the CRC logic 128, using either mux line A or mux line CRC, respectively. Additional editing and transfers to the DRAM are conducted as explained above.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

The present invention provides a fast, flexible ATM switch having an internal transfer circuit which allows portions of an ATM cell to be edited before and after storage on an internal DRAM. The ATM switch provides a parity generator and parity check comparator circuit to monitor errors which may be induced during internal transfers. The internal transfer circuit comprises helper flip/flops (HFF) such that ATM data can be transferred from an internal ISAM to a HFF, edited, and transferred directly to another HFF prior to storing in the DRAM. The transfer circuit further provides an output edit register comprising of OR-type gates to edit the ATM data during an output transfer from the DRAM to an OSAM.

What is claimed is:

1. A method of transferring data in a serial data switch comprising a plurality of serial access memories (SAMs) and a dynamic random access memory (DRAM) connected to the plurality of SAMs, the method comprising the steps of;

loading a serial data cell in one of the plurality of SAMs;

transferring at least a portion of the serial data cell to an edit buffer;

editing the at least a portion of the serial data cell contained in the edit buffer;

transferring the contents of edit buffer and a remaining portion of the serial data cell to the DRAM;

generating a parity code based on the contents of the edit buffer and the remaining portion of the serial data cell; and storing the parity code in the DRAM.

2. A method of transferring data in an asynchronous transfer mode (ATM) switch comprising a plurality of serial access memories (SAMs) and a dynamic random access memory (DRAM) connected to the plurality of SAMs, the method comprising the steps of;

transferring an ATM data cell stored in the DRAM to an error check circuit;

generating an error code based on the ATM data cell;

comparing the generated error code to a pre-determined error code;

editing at least a portion of the ATM data cell; and transferring the edited ATM data cell to one of the plurality of SAMs.

3. A method of transferring data in a asynchronous transfer mode (ATM) switch comprising a plurality of serial access memories (SAMs) and a random access memory (RAM) connected to the plurality of SAMs, the method comprising the steps of;

loading an ATM data cell into one of the plurality of SAMs;

latching at least part of the ATM data cell in a first helper flip/flop;

editing the at least part of the ATM data cell;

transferring the at least part of the ATM data cell from the first helper flip/flop to a second helper flip/flop;

transferring the at least part of the ATM data cell from the second helper flip/flop to the DRAM;

generating a parity code based on the at least part of the ATM data cell; and storing the parity code in the DRAM.

* * * * *

UNITED STATES PATENT AND TRADEMARK OFFICE
CERTIFICATE OF CORRECTION

PATENT NO. : 5,719,890

DATED : February 17, 1998

INVENTOR(S) : Mark Thomann et al.

It is certified that error appears in the above-identified patent and that said Letters Patent is hereby corrected as shown below:

On the title page item [75],
 delete "Thomman" and insert --Thomann--.

Signed and Sealed this

Thirteenth Day of October 1998

Attest:

BRUCE LEHMAN

Attesting Officer

Commissioner of Patents and Trademarks